United States Patent [19]

Evers et al.

[11] 4,243,469

[45] Jan. 6, 1981

[54] HEAT SEALER MECHANISM

[75] Inventors: Jack R. Evers, Torrance; Michael I. Bauerkemper, Cerritos, both of Calif.

[73] Assignee: Developak Corporation, Redondo Beach, Calif.

[21] Appl. No.: 76,448

[22] Filed: Sep. 17, 1979

[51] Int. Cl.³ ............................................. B30B 5/02
[52] U.S. Cl. ................................. 156/583.1; 53/373; 53/479
[58] Field of Search ............... 156/515, 583.1; 53/479, 53/481, 373

[56] References Cited

U.S. PATENT DOCUMENTS

| | | | |
|---|---|---|---|
| 3,986,921 | 10/1976 | Putnam | 156/583.1 |
| 4,167,435 | 9/1979 | Olschewski | 156/583.1 |

*Primary Examiner*—Douglas J. Drummond
*Attorney, Agent, or Firm*—Charles E. Brown

[57] ABSTRACT

This relates to a heat sealer for engaging heat sealable material between a pair of heat sealer members and clamping the material to be heat sealed under a controlled force. The heat sealing mechanism includes a pair of parallel members which are mounted for movement in unison and in opposite direction and which carry the heat sealing members which face in opposed relation. A pressure device is attached to one of the parallel members for moving the parallel members to a closed heat sealing position and a mechanical mechanism in the form of a cam is connected to the other of the parallel members for overriding the pressure device and effecting opening of the heat sealing members. The pressure device is in the form of a simple fluid cylinder and the fluid supply therefor is of the variable type whereby the controlled force exerted by the heat sealing members on the article to be heat sealed may be selectively varied.

10 Claims, 4 Drawing Figures

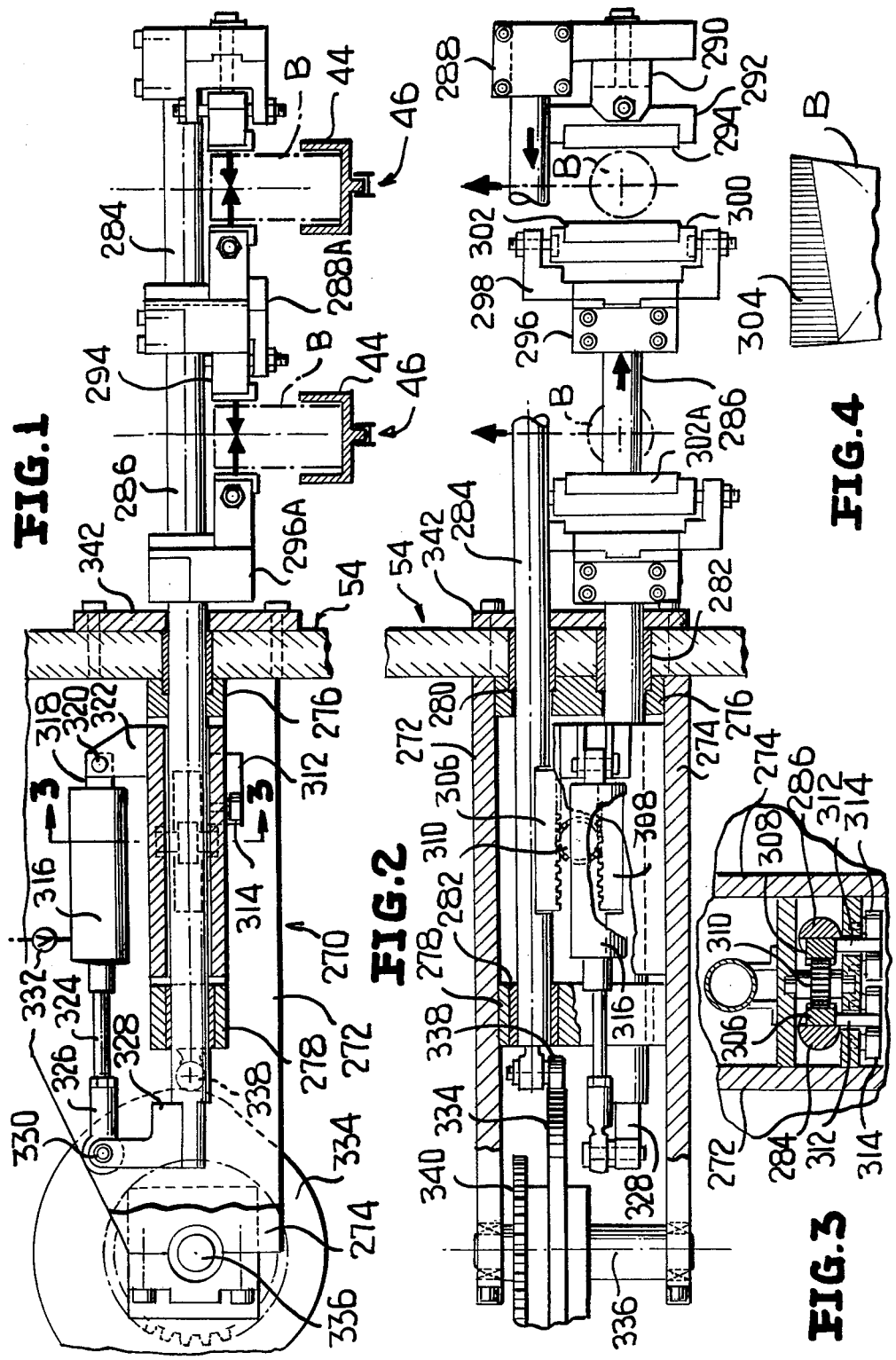

HEAT SEALER MECHANISM

This invention relates in general to new and useful improvements in heat sealing mechanisms, more particularly to a heat sealing mechanism which is particularly adapted to have engaged therebetween an article or material which is to be heat sealed with the article being firmly clamped during the application of the necessary sealing heat.

This invention particularly relates to a heat sealing mechanism which may be readily utilized in closing plastic material bags after the bags have been filled.

In accordance with this invention there are provided two parallel members which are mounted for axial movement and in opposite directions. The parallel members are connected together by coupling means which cause the members to move in opposite directions when one of the members is moved. Thus the members will move in unison, but in opposite directions.

Adjacent ends of the parallel members face in the same direction but are spaced apart. An end of one of the parallel members is provided with a bracket carrying a heat sealing member which faces in the same direction as the ends of the parallel members. The other of the parallel members carries a return bracket which supports a heat sealing member facing in the opposite direction from the first mentioned heat sealing member and being cooperable therewith to clamp the material to be heat sealed therebetween.

One of the parallel members is constantly engaged by a pressure exerting device which urges the heat sealing members together under a predetermined pressure. The pressure device is preferably in the form of a simple fluid motor which has coupled thereto a variable pressure fluid source so that the controllable force exerted by the heat sealing members may be selectively varied.

While the pressure device constantly urges the heat sealing members to a closed position, the other of the parallel members has engaged therewith a mechanical mechanism for urging the heat sealing members apart. The mechanical mechanism is preferably in the form of a simple cam which is engaged by a cam follower carried by the other parallel member. The cam is mounted for rotation and it is driven in timed relation to the placing of articles to be heat sealed between the heat sealing members or jaws.

A further feature of the invention is the mounting of the heat sealing mechanism. In accordance with the invention, the heat sealing mechanism may be part of a machine which includes a sterile portion and a machinery portion separated by a wall. The wall functions as a support and has mounted thereon the heat sealing mechanism. The two parallel members extend through the wall and are movable relative to the wall for the positioning of the heat sealing members.

With the above and other objects in view that will hereinafter appear, the nature of the invention will be more clearly understood by reference to the following detailed description, the appended claims and the several views illustrated in the accompanying drawings.

FIG. 1 is a elevational view with parts broken away and shown in section.

FIG. 2 is a plan view with parts broken away and shown in section.

FIG. 3 is a fragmentary transverse vertical sectional view taken generally along the line 3—3 of FIG. 1.

FIG. 4 is a fragmentary elevational view showing an upper part of a bag having the upper end heat sealed closed in accordance with this invention.

Referring now to the drawings in detail, it will be seen that the heat sealer, which is the subject of this invention, is generally identified by the numeral 270 and it is carried by the wall 54. The heat sealer 270 includes a suitable support structure including a pair of support plates 272, 274 which are rigidly secured to the left side of the wall 54 and project therefrom in spaced parallel relation. The support plates 272, 274 are maintained in spaced relation by spacers 276, 278, as is best shown in FIG. 2. The spacers 276, 278 have bores therethrough which are provided with bushings 280, 282 in which there are mounted for axial reciprocation parallel members 284, 286 which are in the form of rods. The end of the rod 284 is provided with a bracket 288 which is generally L-shaped in configuration and includes a mounting element 290 pivotally mounting a holder 292 for a heat sealing element 294 which is preferably of the electrical energized type.

The right hand end of the rod 286 is provided with a bracket 296 which, in turn, carries a bracket element 298 which mounts for pivotal movement a holder 300 for a heat sealing element 302. It is to be noted that the holder 292 is mounted for pivoting about a vertical axis while the holder 300 is mounted for pivoting about a horizontal axis. In this manner, complete alignment of the opposed faces of the heat sealing elements 294, 302 is assured.

In the case of the machine from which the heat sealer 270 is designed, two heat sealing operations are performed simultaneously. Accordingly, in spaced relation to the bracket 288, the rod 284 carries a similar L-shaped bracket 288A which in turn carries a heat sealing element 294A. In a like manner, an intermediate portion of the rod 286 carries a bracket 296A which supports a heat sealing element 302A.

With respect to the heat sealing elements 294, 302, these elements are spaced apart a sufficient distance for a filled bag B to have the upper end portion thereof passed therebetween, the bag B being carried by a pocket 44 of a conveyor 46. The conveyor 46 is indexed so as to stop the filled bag B between the heat sealing elements. The rods 284, 286 are then moved in opposite directions to move the heat sealing elements 294, 302 together to effect a generally trapezoidal heat sealing of the upper end of the bag B, as is best shown in FIG. 4. The heat seal is generally identified by the numeral 304.

It is to be noted from the drawings that there are two conveyors 46 and thus two bags B are simultaneously presented to the heat sealer.

In order that the rods 284, 286 move simultaneously and in opposite directions, the rod 284 carries a rack segment 306 which opposes a rack segment 308 carried by the rod 286. Disposed between the rack segments 306, 308 is a pinion gear 310 which is meshed with the two rack segments. The pinion gear 310 may be suitably mounted in any desired manner including that shown in FIG. 3.

It is also to be noted that the rods 284, 286 are prevented from rotating about their axes by guide elements 312 depending downwardly therefrom. It is to be noted that the guide elements have their lower portions passing between a pair of guide rollers 314.

The rods 284, 286 are constantly urged towards an operative position by means of a fluid cylinder 316. The fluid cylinder 316 has a mounting support 318 which is journalled on a pin 320 carried by brackets 322. A piston rod 324 extends from the opposite end of the cylinder 316 and has an adjustable fitting 326 which is pivotally connected to a bracket 328 by a pivot pin 330. The bracket 328 is rigidly secured to the left end of the rod 286. A suitable fluid under pressure, such as air, is directed into the left end of the cylinder 316 through a pressure regulating and control valve 332. In this manner the heat sealing elements may be engaged with a bag to be heat sealed under a controlled pressure or force.

The fluid cylinder 316 is overriden by means of a cam 334 which is journalled on a shaft 336 extending between the support plates 272, 274. The cam 334 is engaged by a cam follower 338 carried by the left end of the rod 284.

It is to be understood that the cam 334 is periodically rotated one revolution in timed relation to the indexing of the conveyors 46 by a suitable drive mechanism, not shown. The drive mechanism is coupled to the cam 334 through a drive sprocket 340.

As stated above, the fluid cylinder 316 constantly urges the rod 286 to the right. The racks 306, 308 and the pinion 310 cooperate to constantly urge the rod 284 to the left thereby urging the heat sealing elements 294, 302 together. The cam 334, however, positions the rods 284, 286. The cam 334, in its stopped position, causes the heat sealing elements to be spaced apart. When the cam 334 is rotated, the fluid cylinder 316 causes movement of the heat sealing elements together and finally causes the heat sealing elements to clamp closed the upper end portion of the bag B and heat seal the same closed under a controlled force as determined by the fluid pressure in the fluid cylinder 316.

At this time it is pointed out that the wall 54, dividing the machine into a sanitary part and a machine part has all of the operating mechanism of the heat sealer 270 mounted to the left thereof and all of the heat sealing elements to the right thereof. Where the rods 284, 286 extend through the wall 54, a suitable closing and sealing plate 342 is provided.

Although only a preferred embodiment of the heat sealer 270 has been specifically illustrated and described herein, it is to be understood that minor variations may be made therein without departing from the spirit and scope of the invention, as defined by the appended claims.

I claim:

1. A heat sealer for closing bags and the like, said heat sealer comprising a pair of parallel members, means mounting said parallel members for separate axial movement, said parallel members having spaced adjacent ends facing in the same direction, a first bracket carried by one of said parallel members and having a first heat sealing member thereon facing in the same direction as said parallel member ends, a second bracket carried by the other of said parallel members and having a second heat sealing member thereon facing in the opposite direction and opposing said first heat sealing member, coupling means coupling said parallel members together for movement in unison and in opposite directions, pressure means reacting on one of said parallel members urging said heat sealing members under a controlled force, mechanical means for reacting on the other of said parallel members to urge said heat sealing members apart against the resistance of said pressure means, and drive means for actuating said mechanical means.

2. A heat sealer according to claim 1 wherein said pressure means are variable for varying said controlled force.

3. A heat sealer according to claim 1 wherein said pressure means is in the form of a fluid cylinder having an actuating rod coupled to said one parallel member.

4. A heat sealer according to claim 3 wherein said fluid cylinder is coupled to a variable fluid pressure source for varying said controlled force.

5. A heat sealer according to claim 1 wherein said coupling means includes gear racks on said parallel members in opposed relation, and an intermediate pinion gear disposed between and meshed with said racks.

6. A heat sealer according to claim 1 wherein said mechanical means is in the form of a rotatable cam.

7. A heat sealer according to claim 6 wherein said drive means includes means for rotating said cam.

8. A heat sealer according to claim 1 wherein said heat sealer is part of a machine having a combined divider and support wall with said machine having a sanitary portion on one side of said wall and a machinery portion on the other side of said wall, and said heat sealer is mounted on said wall with said parallel members extending through said wall.

9. A heat sealer according to claim 1 wherein each parallel member is a circular cross sectional rod, and there are guide means including a guide member and guide rollers for preventing rotation of said rod.

10. A heat sealer according to claim 1 wherein there is a second set of heat sealing members carried by said parallel members.

* * * * *